Sept. 22, 1964 R. VOGT 3,149,602
HYDROFOIL BOAT WITH WAVE AND CAVITATION CONTROL
Filed March 11, 1963 2 Sheets-Sheet 1
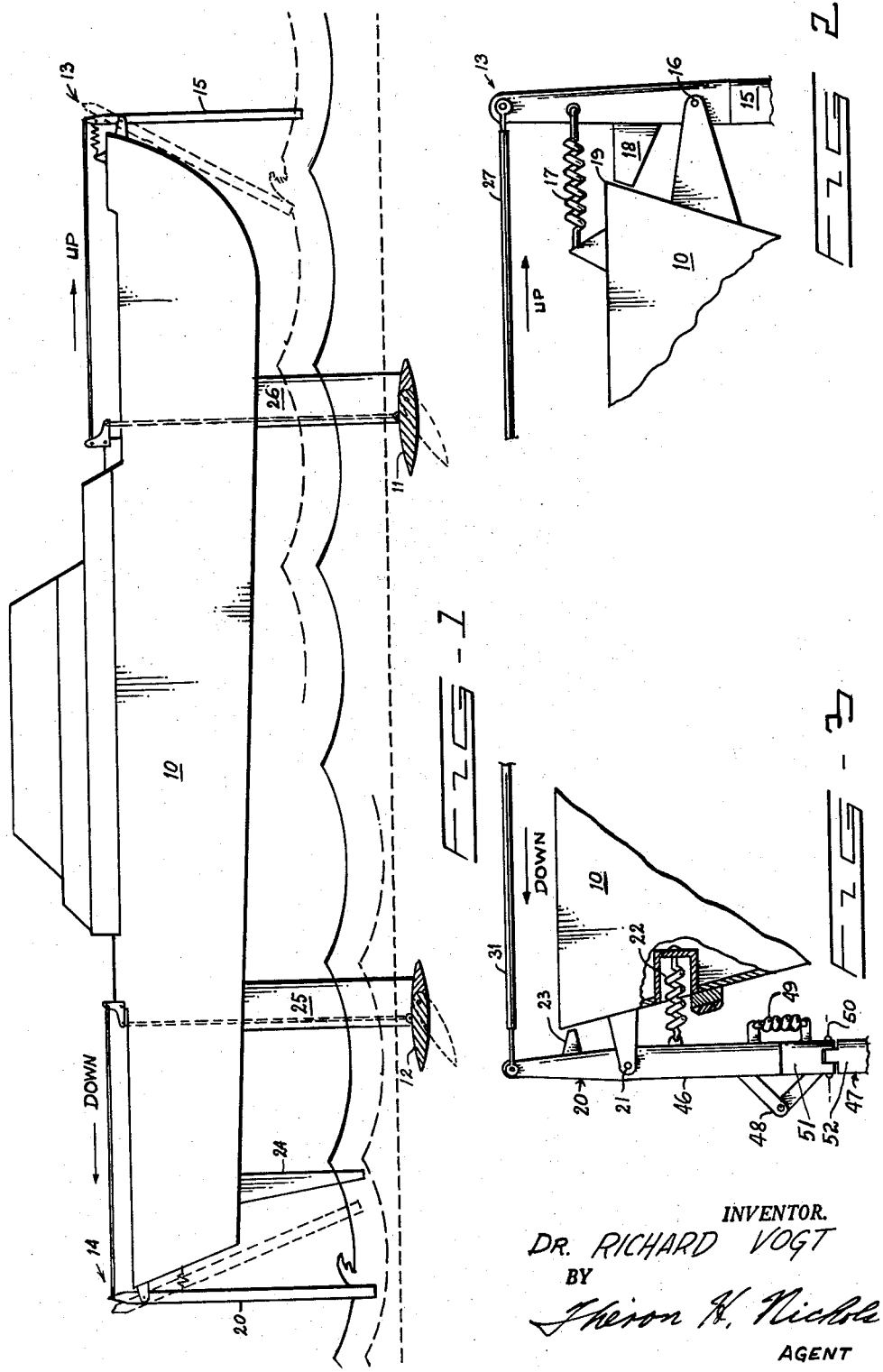
INVENTOR.
DR. RICHARD VOGT
BY
AGENT Sept. 22, 1964   R. VOGT   3,149,602
HYDROFOIL BOAT WITH WAVE AND CAVITATION CONTROL
Filed March 11, 1963   2 Sheets-Sheet 2

INVENTOR.
DR. RICHARD VOGT
BY
Theron K. Nichols
AGENT

United States Patent Office 3,149,602
Patented Sept. 22, 1964

3,149,602
HYDROFOIL BOAT WITH WAVE AND
CAVITATION CONTROL
Richard Vogt, Santa Barbara, Calif., assignor to The
Boeing Company, Seattle, Wash., a corporation of
Delaware
Substituted for abandoned application Ser. No. 126,846,
July 19, 1961. This application Mar. 11, 1963, Ser.
No. 265,311
19 Claims. (Cl. 114—66.5)

This invention pertains to a hydrofoil boat and means for maintaining the boat at a particular distance above the water.

This is a substitute application for abandoned application Serial No. 126,846 filed July 19, 1961.

More specifically this invention pertains to a hydrofoil boat having means for raising and lowering the boat relative to the surface of the water between a position wherein the boat is about to contact the surface of the water and a position wherein the hydrofoils are at the cavitation line where cavitation of the hydrofoils result.

Herebefore hydrofoil craft with movable or controllable hydrofoils utilized booms or boom mechanisms protruding out in front of the boat. Attached to these booms were either vanes or floats for riding substantially on the surface of the water or a predetermined depth below the water as determined by the float boom mechanism. A typical hydrofoil boat of this type is shown in Patent U.S. 2,603,179. This type of hydrofoil craft with hydrofoil control means is limited in speed because of the cumbersome and forwardly protruding boom or vane mechanism on the front of the boat. Also, because the waves obviously affect this boom mechanism, some type of damping mechanism would have to be incorporated in the control system for preventing undue periodic pitching, and for maintaining the boat steady. When flotsam or any other type of floating debris is encountered by the boom mechanism, destruction or damage thereof results.

Other unsuccessful types have been disclosed for controlling a hydrofoil boat such as disclosed in U.S. Patent 2,722,189 wherein two vanes are utilized on the bow which continually protrude down into the water and extend under the boat. This type has its limitations due to the continual and constant submersion of the forward vanes in the water and which vanes are affected by flotsam or other floating debris on the surface of the water. Likewise this system is also directly affected by each wave encountered by the hydrofoil craft for causing the boat to rise and lower with each wave.

Accordingly a principal object of this invention is to provide a hydrofoil boat with hydrofoil control means comprising two means, one means being positioned normally above and out of contact with the surface of the water and a second means being positioned normally below the surface of the water and in a protected or aft position on the boat.

A further object of this invention is to provide a hydrofoil boat with hydrofoil control means comprising wave detecting means normally positioned above the surface of the water and operable to transmit an up command when contact is made with the surface of the water and cavitation line detecting means normally extending beneath the surface of the water and operable to transmit a down command when the hydrofoils reach the cavitation line.

A still further object of this invention is to provide a hydrofoil control system for a hydrofoil boat including a downwardly extending surface detecting means normally out of contact with the water surface but which is urged aft of a downwardly extending position by contact thereof with the surface of the water for raising the boat.

Another object of this invention is to provide for a boat hydrofoil control system having a cavitation line detecting forwardly urged deflector means that is urged forwardly from a downwardly extending position due to a decreased impingement of the water against the deflector as the hydrofoil moves up to the cavitation line for lowering the boat.

Another object of this invention is to provide a hydrofoil control means for a boat wherein safety means is provided on at least one of the downwardly extending control vanes whereby the vane is pivoted aft due to contact thereof with foreign material in the water.

Another object of this invention is to provide a hydrofoil control means which is retractable transversely out of the water.

Another object of this invention is to provide a hydrofoil control means on a boat comprising linkage means interconnecting a surface detecting means and a cavitation line detecting means with controllable hydrofoils on the boat.

Another object of this invention is to provide a hydrofoil control means comprising interconnecting linkage between a surface detecting means and a cavitation line detecting means for operating a single hydrofoil.

Other objects and various advantages of the disclosed hydrofoil boat with wave and cavitation control means will be apparent from the following detailed description, together with the accompanying drawings, submitted for purposes of illustration only and not intended to define the scope of the invention, reference being had for that purpose to the subjoined claims.

Briefly, this invention comprises a hydrofoil boat with either one or two controllable hydrofoils connected to an automatically operated boat position sensing means. One sensing means comprises a vane spring biased to a downwardly extending position and normally positioned out of the water when the boat is riding high enough to clear the waves and which vane upon contact with the surface of the water when the boat has sunk below its operating range, produces a boat up signal to the controllable hydrofoils. The other boat position sensing means comprises a second vane spring biased forwardly of a downwardly extending position to provide a boat down signal for lowering the hydrofoils out of the cavitation area when the boat has risen too high in the water. The boat is lowered until impingement of the water urges rearwardly and maintains the second vane in the downwardly extending position where no signal is generated. Safety means is disclosed for incorporation in the vanes for preventing breaking and fracturing of the vanes upon contact with flotsam, retracting means is disclosed for incorporating in the vanes for raising thereof, and a further safety feature of the control system is disclosed wherein the vanes are so constructed that either may be mounted just aft of a protection strut or a hydrofoil support strut.

The drawings diagrammatically illustrate by way of example, not by way of limitation, at least two forms of the invention wherein like referenced numerals designate corresponding parts in the several views in which:

FIG. 1 is a side view partly in section of a hydrofoil boat with the disclosed hydrofoil control system thereon;

FIG. 2 is a detailed side view of the wave detecting means portion of the overall hydrofoil control system for raising the boat higher above the surface of the water;

FIG. 3 is a detailed side view, with parts cut away for clarity of disclosure, of the cavitation detecting means portion of the hydrofoil control system for lowering the boat relative to the surface of the water;

Figure 4:
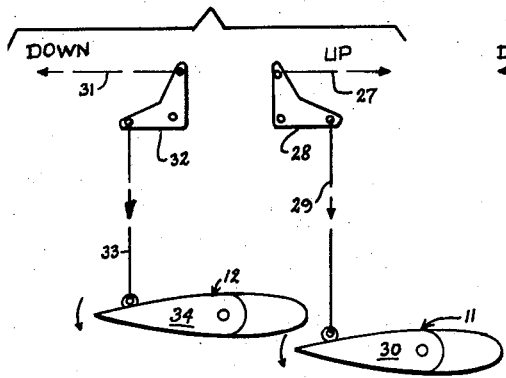
FIG. 4 is a schematic view of the linkage from both detecting means of a hydrofoil control system for operating two controllable hydrofoils.

FIG. 1 discloses a typical hydrofoil boat in which the invention may be utilized wherein the boat 10 is supported by two controllable hydrofoils, a forward hydrofoil 11 and a rearward hydrofoil 12.

A boat up command forward wave detecting or water surface detecting means 13 is shown connected or pivotally mounted on the bow of the boat and a boat down command cavitation line detecting means 14 is positioned on the aft end of the boat.

The boat up command water surface detecting means 13, FIG. 2, comprises a vane or surface detecting means 15 pivotally mounted to the boat with pivot 16 and spring biased forwardly to the vertical position with a tension spring 17 until stopped by a suitable projection or stop 18 on the vane. The vane 15 is prevented from moving forwardly beyond the vertical position by the projection 18 contacting a portion 19 of the bow. Vane 15 is short enough whereby it does not normally contact the water when the hydrofoils are submerged below the cavitation line for normal cruising position as illustrated by the solid line forward portion of FIG. 1. Accordingly in operation, when the boat sinks below the predetermined operating area as for example where it will be contacted by the waves as shown by the broken line forward portion of FIG. 1, then the vane 15 or surface detecting means is struck by the water and pivoted aft thereby causing an up command to be generated by the linkage connected thereto described thereinafter for raising the boat, i.e., forward hydrofoil 11 is lowered, the resultant added lift of which causes the bow, and accordingly the whole boat to rise a greater distance above the water.

The boat down command cavitation line detecting means 14 comprises a downwardly extending vane or cavitation line detecting means 20 connected to the stern of the boat by pivot 21. A tension spring 22 is connected to the vane 20 below pivot 21 and a projection 23 is positioned on the vane above the pivot so that the spring normally urges the vane forwardly from a vertical position to a forwardly extending position.

Upon the boat rising from the cruising solid line position of FIG. 1 to the broken line position where the hydrofoils begin to approach the cavitation line, then the hydrodynamic pressure upon the vane 20 is decreased such that the forces of the spring take effect and actuate the vane 20 forwardly to give a down signal to the hydrofoils. Thus, due to the increased lift at the aft end of the boat caused by lowering of rearward hydrofoil 12, the boat is controlled to sink downwardly until the hydrofoils are lowered well below the cavitation line for efficient operation, and until the hydrodynamic pressure again forces vane 20 rearwardly.

The detrimental results of cavitation is a reduction in the efficiency of the foils and erratic operation of the boat. If pushed beyond the limit, the foil system will lose lift and the craft will fall back into the water.

While a metallic helical spring is preferred in usage for the tension spring means 17 and 22 for actuation of the respective forward and aft vanes, obviously other means may be utilized for actuating the surface detector and the cavitation line detector, such as but not limited to, a bungee cord, an elastic plastic device, an air cylinder and accumulator, or a mechanical or electrical detecting and repositioning means, etc., depending on the requirements of the particular hydrofoil boat.

While not a part of this invention, if the boat and/or the foil system are not inherently stable, obviously suitable artificial pitch, yaw, and roll stabilization means may be incorporated therewith.

A beam 24, FIG. 1, may be attached to the boat bottom immediately forward of the aft vane 20 as shown for protection of the beam.

The control mechanism for the forward hydrofoil 11 on forward strut 26 is shown in FIGS. 2 and 4 wherein a boat up command link 27, FIG. 2, is pivotally connected between the top of vane 15 and a bell crank 28, FIG. 4. Vertical link 29 is connected between the bell crank 28 and movable portion 30 of the forward hydrofoil 11.

In regard to the cavitation line vane detecting means 20, FIG. 3, a boat down command link 31, FIGS. 3 and 4, is pivotally connected between top of vane 20, FIG. 3, and a second bell crank 32, FIG. 4. Vertical link 33 is pivotally connected between the bell crank 32 and the movable portion 34 of aft hydrofoil 12.

Figure 5:
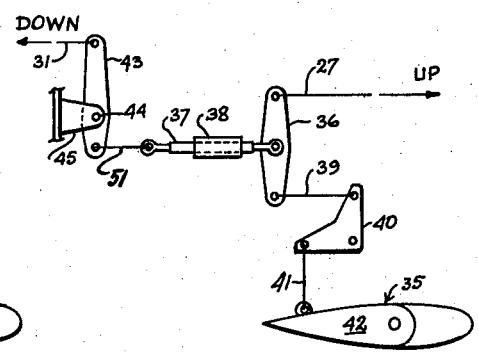
FIG. 5 is a schematic view of a hydrofoil control system for operation of a single controllable hydrofoil.

While the boat up and down command sensing means of the embodiment of FIG. 4 is illustrated as operating two different hydrofoils, if so desired, with different types of boats, particularly one having only one movable hydrofoil, both sensing means may be connected to the single hydrofoil. Such an alternate hydrofoil control means for operating a single controllable hydrofoil 35 on a boat is shown in FIG. 5 wherein the boat up command link 27 is pivotally connected between a surface detecting vane, such as vane 15, FIG. 1 and the upper end of an arm 36, FIG. 5, the arm being pivotally supported intermediate its ends on axially slidable rod 37. Sleeve 38 which is fixed to the boat slidably supports rod 37. Horizontal link 39 is pivotally connected between the lower end of arm 36 and a bell crank 40. Vertical link 41 is pivotally connected between bell crank 40 and movable portion 42 of the single hydrofoil 35, the latter hydrofoil being similar to forward hydrofoil 11, FIG. 1.

Also in FIG. 5, boat down command link 31 is pivotally connected between the cavitation line vane detecting means 20 and the upper end of an arm 43, the latter arm being pivotally supported intermediate its ends by pin 44 on fixed structure 45 on the boat. Horizontal link 51 pivotally connects the lower end of arm 43 to the slidable rod 37 for upward actuation of the movable portion 42 of single hydrofoil 35 causing the hydrofoil to dive deeper in the water away from the cavitation line. Thus with the single hydrofoil 35 positioned forwardly of the boat similar to hydrofoil 11, FIG. 1, except the portion 42 is required to be movable both up and down, the boat is made to rise or fall, respectively, relative to the surface of the water.

As shown in FIG. 3, vane 20 comprises two parts, 46 and 47, respectively, pivotally interconnected with pin 48. A tension spring 49 interconnects the parts 46 and 47 of the vane 20 for urging the two parts collinear. During normal hydrofoil operation, the two parts are maintained collinear. Nevertheless upon contact with flotsam or other floating debris, the lower part 47 swings back or is pivoted back about the pivot pin 48 to thereby obviate fracture of the cavitation line vane detection means 20. Obviously vane 15 may be so constructed if desired.

Likewise a second pivot pin 50, FIG. 3, positioned below pivot pin 48 of vane 20 but normal thereto is provided for pivotally interconnecting two portions 51 and 52 of lower part 47 whereby pivotal movement of the lower portion 52 is transversely and upwardly for folding or retracting the vane out of the water into a stowed position. The retracting means for folding lower portion 52 upwardly comprises any conventional motor, such as but not limited to a hydraulic actuator. Vane 15 also may be so constructed if desired.

Figure 6:
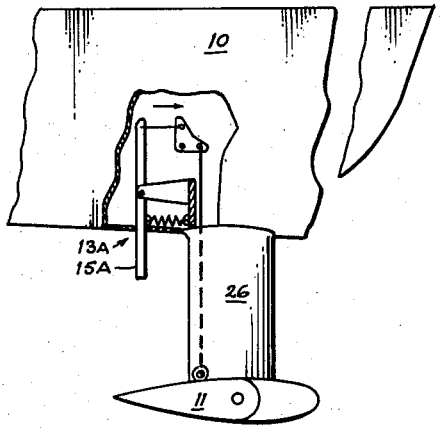
FIG. 6 is a detailed side view partly in section of a modified wave detecting means.

An alternate boat up command water surface detecting means 13a is disclosed in FIG. 6 wherein the surface detecting vane 15a is mounted to the boat immediately aft of the forward hydrofoil strut 26. The lengths of the various linkage of the instant surface detecting means 13a are varied over that of the FIG. 5 embodiment in order to so position the vane 15a aft of the strut for greater reliability of control of the forward hydrofoil 11 in the case of maneuvering around and contacting flotsam or other floating debris.

Figure 7:
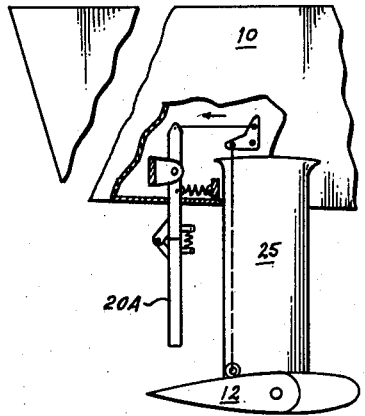
FIG. 7 is a detailed side view partly in section of another cavitation detecting means.

Also for reasons of increased reliability of control of the aft hydrofoil 12, FIG. 7 discloses a slightly varied linkage for positioning of the boat down command cavitation line detecting vane 20a immediately aft of the aft hydrofoil supporting strut 25. With the vane 20a thus positioned relative to and combined with the aft hydrofoil strut 25, and/or vane 15a, FIG. 6, positioned relative to and combined with the fore hydrofoil strut 26, operation of the boat in flotsam covered water is of no detriment to the reliability of control and safety of the boat.

In the modification of FIG. 5 wherein only one movable hydrofoil is utilized for control of the height of the boat above the surface of the water, the features of the embodiment of FIGS. 6 and 7 may likewise be combined therewith, if so desired for various reasons. In this case the two sensing vanes could be attached to the boat or struts side-by-side immediately aft of the operable hydrofoil strut or attached in tandem aft of the strut, depending on the size of the particular strut and eddy currents aft of the strut.

Accordingly a hydrofoil boat has been invented which includes a wave and cavitation control system connected to either one or to two movable and controllable hydrofoils and which may be constructed for mounting in various positions relative to the hydrofoil struts. Hydrofoil control means is disclosed comprising the wave detecting means normally positioned above the surface of the water and operable to transmit a boat up command when contact is made with the surface of the water, this up command being transmitted to either one or both hydrofoils. Also the disclosed hydrofoil control means comprises a cavitation detecting means normally protruding beneath the surface of the water and operable to transmit a boat down command to lower the boat when the hydrofoils have reached the cavitation line. Likewise it has been shown how either or both of the vanes may be combined in various manners with the hydrofoils for protection and increased reliability of control. Likewise one or both of the hydrofoils may be formed in two pivotally connected parts and spring biased in such a manner that one part may be pivoted rearwardly upon contact with foreign material in the water. An additional pivot may be added to either one of the vanes or both of the vanes for transverse pivotal movement thereof from the water to stowed position. Likewise linkage has been shown with which either or both vanes may be connected to either one or two controllable hydrofoils.

While only a few embodiments of the invention have been shown in the accompanying drawings it will be evident that various other modifications are possible in the arrangement and construction of the disclosed hydrofoil boat.

I claim:

1. A hydrofoil boat comprising in combination, a boat, hydrofoil means connected to said boat and comprising at least two hydrofoils, said hydrofoil means comprising means for raising and lowering the boat relative to the surface of the water between a position wherein the boat is about to contact the surface of the water and a position wherein the hydrofoils are at or above a cavitation line where cavitation of said hydrofoils may result, means for controlling said hydrofoil means, said control means comprising a water surface detecting means normally positioned above the surface of the water and rotatable about a thwartship axis when contact is made with the surface of the water, mechanical linkage means including a plurality of interconnected links connected directly to said water surface detecting means, said mechanical linkage means being responsive to said water surface detecting means for transmitting a boat up command to said hydrofoil means, and a cavitation detecting means normally protruding beneath the surface of the water and rotatable about a thwartship axis when said hydrofoils reach the cavitation line to transmit a boat down command to said hydrofoil means.

2. In a hydrofoil boat having at least two hydrofoils, hydrofoil control means for maintaining the boat above the surface of the water and for maintaining the hydrofoils below a cavitation line wherein cavitation of the hydrofoils may result at or above the cavitation line, said control means comprising surface detecting means pivotally mounted directly on the bow of the boat in a position normally out of contact with the surface of the water and rotatable about a thwartship axis, said surface detecting means being responsive to contact with the water by movement about said thwartship axis for operating one of said hydrofoils to raise the boat, and said control means comprising cavitation detecting means mounted on the boat in a position normally protruding beneath the surface of the water and rotatable about a thwartship axis, said cavitation detecting means being responsive to movement of the hydrofoils to the cavitation line by movement about said thwartship axis for operating one of said hydrofoils to lower the boat.

3. A hydrofoil boat having at least two hydrofoils, control means for maintaining the boat above the surface of the water and for maintaining the hydrofoils below the cavitation line, said hydrofoil control means comprising surface detecting means normally positioned out of contact with the water and rotatable about a thwartship axis and cavitation line detecting means normally protruding below the surface of the water and rotatable about a thwartship axis, mechanical linkage means between one of said detecting means and one of said hydrofoils, said mechanical linkage means comprising at least two interconnected links, said surface detecting means being responsive to contact of the surface detecting means with the water for movement about said thwartship axis for operating one of said hydrofoils for raising the boat, and said cavitation line detecting means being responsive to movement of the hydrofoils to the cavitation line for movement about said thwartship axis for operating one of said hydrofoils for lowering the boat.

4. Hydrofoil boat control means as recited in claim 3 wherein said surface detecting means comprises spring biased downwardly extending means whereby the downwardly extending means is urged aft of a downwardly extending position by contact thereof with the surface of the water for operating one of said hydrofoils for raising the boat.

5. Hydrofoil boat control means as recited in claim 3 wherein said cavitation line detecting means comprises a deflector means spring biased forwardly of a downwardly extending position whereby the deflector is urged forwardly of the downwardly extending position due to a decreased impingement of the water against the deflector as the hydrofoil moves up to the cavitation line for operating one of said hydrofoils for lowering the boat.

6. Hydrofoil boat control means as recited in claim 3 wherein one of said detecting means comprises a downwardly extending means, said downwardly extending means comprising two hingedly connected collinear parts.

7. Hydrofoil boat control means as recited in claim 3 wherein one of said detecting means comprises a downwardly extending means, said downwardly extending means comprising two hingedly connected portions wherein the lower part is pivotable upwardly for retraction thereof when not in use.

8. A hydrofoil boat having a first controllable hydrofoil and a second controllable hydrofoil, hydrofoil control means for maintaining the boat above the surface of the water and for maintaining the hydrofoils below the cavitation line, said hydrofoil control means comprising surface detecting means normally positioned out of contact with the water and rotatable about a thwartship axis and cavitation line detecting means normally protruding below the surface of the water and rotatable about a thwartship axis, linkage means between said first controllable hydrofoil and said surface detecting means, said linkage means comprising at least two interconnected links, linkage means between said second controllable hydrofoil and said cavitation line detecting means, said surface detecting means being responsive to contact with the water by movement about said thwartship axis for operating said first controllable hydrofoil for raising the boat, and said cavitation line detecting means being responsive to movement of the hydrofoils to the cavitation line by movement about said thwartship axis for operating said second controllable hydrofoils for lowering the boat.

9. A hydrofoil boat as recited in claim 8 wherein said surface detecting means comprises spring biased downwardly extending means whereby the downwardly extending means is urged aft of a downwardly extending position by contact thereof with the surface of the water for operating said first hydrofoil for raising the boat.

10. A hydrofoil boat as recited in claim 8 wherein said cavitation line detecting means comprises a deflector means spring biased forwardly of a downwardly extending position whereby the deflector is urged forwardly of the downwardly extending position due to a decreased impingement of the water against the deflector as the hydrofoil moves up to the cavitation line for operating said second hydrofoil for lowering the boat.

11. A hydrofoil boat having a controllable hydrofoil, hydrofoil control means for maintaining the boat above the surface of the water and for maintaining said controllable hydrofoil below the cavitation line, said hydrofoil control means comprising surface detecting means normally positioned out of contact with the water and rotatable about a thwartship axis and cavitation line detecting means normally protruding below the surface of the water and rotatable about a thwartship axis, linkage means between said controllable hydrofoil and said surface detecting means and said cavitation line detecting means, said linkage means comprising at least two interconnected links, said surface detecting means being responsive to contact with the water by movement about said thwartship axis for operating said controllable hydrofoil for raising the boat, and said cavitation line detecting means being responsive to movement of said controllable hydrofoil to the cavitation line by movement about said thwartship axis for operating said controllable hydrofoil for lowering the boat.

12. A hydrofoil boat having a hull comprising,
(a) a boat having at least two hydrofoils thereon,
(b) first control means being mounted on said hull and, said first control means being normally positioned above the surface of the water and rotatable on said hull about a thwartship axis, said first control means generating for one of said hydrofoils a boat up signal upon swinging movement of said first control means about its thwartship axis due to contact with the water, and
(c) second control means, said second control means normally protruding beneath the surface of the water and rotatable about a thwartship axis, said second control means generating for one of said hydrofoils a boat down signal upon swinging movement of said second control means about its thwartship axis due to decreased impingement with the water.

13. A hydrofoil boat as recited in claim 12 wherein,
(a) said swinging movement of said first control means is in an aft direction, and
(b) said swinging movement of said second control means is in a forward direction.

14. A hydrofoil boat as recited in claim 12 wherein,
(a) the same hydrofoil is controlled by both said first control means and said second control means.

15. In the hydrofoil boat as recited in claim 12,
(a) one of said control means comprising two hingedly connected parts,
(b) spring means biasing said parts to a collinear relationship with each other during normal hydrofoil operation, and
(c) said spring means permitting pivotal movement of one of said parts relative to the other part when flotsam or floating debris is encountered.

16. In the hydrofoil boat as recited in claim 10,
(a) one of said control means comprising two hingedly connected portions, and
(b) means for pivoting upwardly one portion relative to the other portion for retraction thereof when not in use.

17. In the hydrofoil boat as recited in claim 12,
(a) a plurality of struts being connected between said hull and said hydrofoils, and
(b) one of said control means being positioned immediately aft of one of said struts, 18. In the hydrofoil boat as recited in claim 17,
(a) said one of said control means being said first control means.

19. In the hydrofoil boat as recited in claim 17,
(a) said one of said control means being said second control means.

References Cited in the file of this patent
UNITED STATES PATENTS

| | | |
|---|---|---|
| 2,576,716 | Gardiner | Nov. 27, 1951 |
| 2,584,347 | Hazard | Feb. 5, 1952 |
| 2,773,467 | Bailey | Dec. 11, 1956 |
| 2,795,202 | Hook | June 11, 1957 |
| 3,104,642 | Piazza | Sept. 24, 1963 |